US009147074B2

(12) United States Patent
Grieco et al.

(10) Patent No.: US 9,147,074 B2
(45) Date of Patent: Sep. 29, 2015

(54) METHOD AND APPARATUS FOR SECURING CPUS BOOTED USING ATTACHED FLASH MEMORY DEVICES

(75) Inventors: Anthony H. Grieco, Wake Forest, NC (US); Chirag K. Shroff, Apex, NC (US); Robert T. Bell, Bountiful, UT (US)

(73) Assignee: Cisco Technology, Inc., San Jose, CA (US)

( * ) Notice: Subject to any disclaimer, the term of this patent is extended or adjusted under 35 U.S.C. 154(b) by 335 days.

(21) Appl. No.: 13/114,831

(22) Filed: May 24, 2011

(65) Prior Publication Data

US 2012/0303941 A1    Nov. 29, 2012

(51) Int. Cl.
*G06F 9/00* (2006.01)
*G06F 15/177* (2006.01)
*G06F 21/57* (2013.01)
*G06F 9/44* (2006.01)

(52) U.S. Cl.
CPC ............ *G06F 21/575* (2013.01); *G06F 9/4401* (2013.01); *G06F 9/4416* (2013.01)

(58) Field of Classification Search
CPC . G06F 9/4401; G06F 9/4416; G06F 11/1417; G06F 21/575

USPC ............................................................. 713/2
See application file for complete search history.

(56) References Cited

U.S. PATENT DOCUMENTS

| 7,017,038 | B1* | 3/2006 | LaChance et al. ................. 713/2 |
| 7,424,398 | B2* | 9/2008 | Booth et al. .................. 702/186 |
| 7,761,717 | B2* | 7/2010 | Moller et al. ................. 713/189 |
| 2007/0260869 | A1* | 11/2007 | Dade et al. ........................ 713/2 |
| 2009/0031194 | A1* | 1/2009 | Bellipaddy et al. ............ 714/764 |
| 2010/0070800 | A1* | 3/2010 | Hanna ................................ 714/6 |
| 2011/0078430 | A1* | 3/2011 | McCoull et al. .................. 713/2 |

* cited by examiner

*Primary Examiner* — Jaweed A Abbaszadeh
*Assistant Examiner* — Xuxing Chen
(74) *Attorney, Agent, or Firm* — Patterson + Sheridan, LLP

(57) ABSTRACT

The present disclosure describes techniques evaluating compute and/or thermal loads (among other things) to aid in managing a collection of one or more containerized or modular data centers. For example, forecasts (or real-time measurements) of environmental factors (as well as projected computing demands) may be used to tailor the compute loads, cooling strategies or other metric of data center operations for a network of containerized or modular data centers. Doing so allows an operator of such a data center network to manage specific operational goals in real time.

19 Claims, 8 Drawing Sheets

METHOD AND APPARATUS FOR SECURING CPUS BOOTED USING ATTACHED FLASH MEMORY DEVICES

TECHNICAL FIELD

Embodiments presented in this disclosure provide techniques for preventing unauthorized modifications to instructions used to boot a computing device by validating and ensuring that a CPU is booting up an authenticated set of instructions.

BACKGROUND

Computer hardware manufacturers often differentiate products based on what features are supported or provided by a given system. For example, a networking vendor could offer a series of networking switches with different capabilities for routing or managing network traffic. In such a case, the number of active switch ports may specified in a licensing agreement with the end user. Similarly, what quality-of-service, security or traffic shaping features are enabled in such a networking device may depend on what model an end user purchases. Similarly still, for rack mounted server systems, the number of systems supported by a chassis may depend what model an end user purchases. As one additional example, the features enabled for an appliance or other turn-key system may be varied based the features a user is willing to pay for.

At the same time, in each of these examples, the underlying computing hardware may be virtually (if not completely) identical. Doing so frequently allows the hardware manufacturer to lower manufacturing costs. In such cases, the hardware vendor may use software or firmware to enable and disable different features of a given computing device. For example, a BIOS, operating system or application software installed on the computing device may be used to configure different versions or models of the underlying platform. However, this approach leaves a computing device vulnerable to so-called "upgrade attacks," where an end user enables dormant capabilities of a computing device by modifying the software used to configure that device. Several cases have occurred where BIOS and OS level code has been modified to circumvent licensing and/or authentication checks done in software. These modifications result in counterfeit, illegally upgraded or otherwise maliciously modified hardware or software being injected into the market.

Further, in some cases the modifications have been made not by an ultimate end-user, but by a channel partner reselling computing devices to end-users. For example, consider two versions of a given networking system, one which sells for $10,000.00 and one which sells for $2,000.00. Assume a reseller modifies one of the $2,000 systems to enable the features of the $10,000.00 system and then sells it to an unsuspecting customer for $7,000.

Not only does such a transaction cost the hardware manufacture substantial revenue, it creates a variety of other problems. For example, the manufacturer may deny the purchaser with the support provided to legitimate purchases of the more expensive system. Similarly, should the system fail, the end-user would likely be denied warranty protection when the unauthorized modification came to light. Thus, these attacks can have a significant impact both directly on the hardware manufacturer's bottom line through direct revenue loss, but also through loss of brand value.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DESCRIPTION

Overview

Figure 1A:
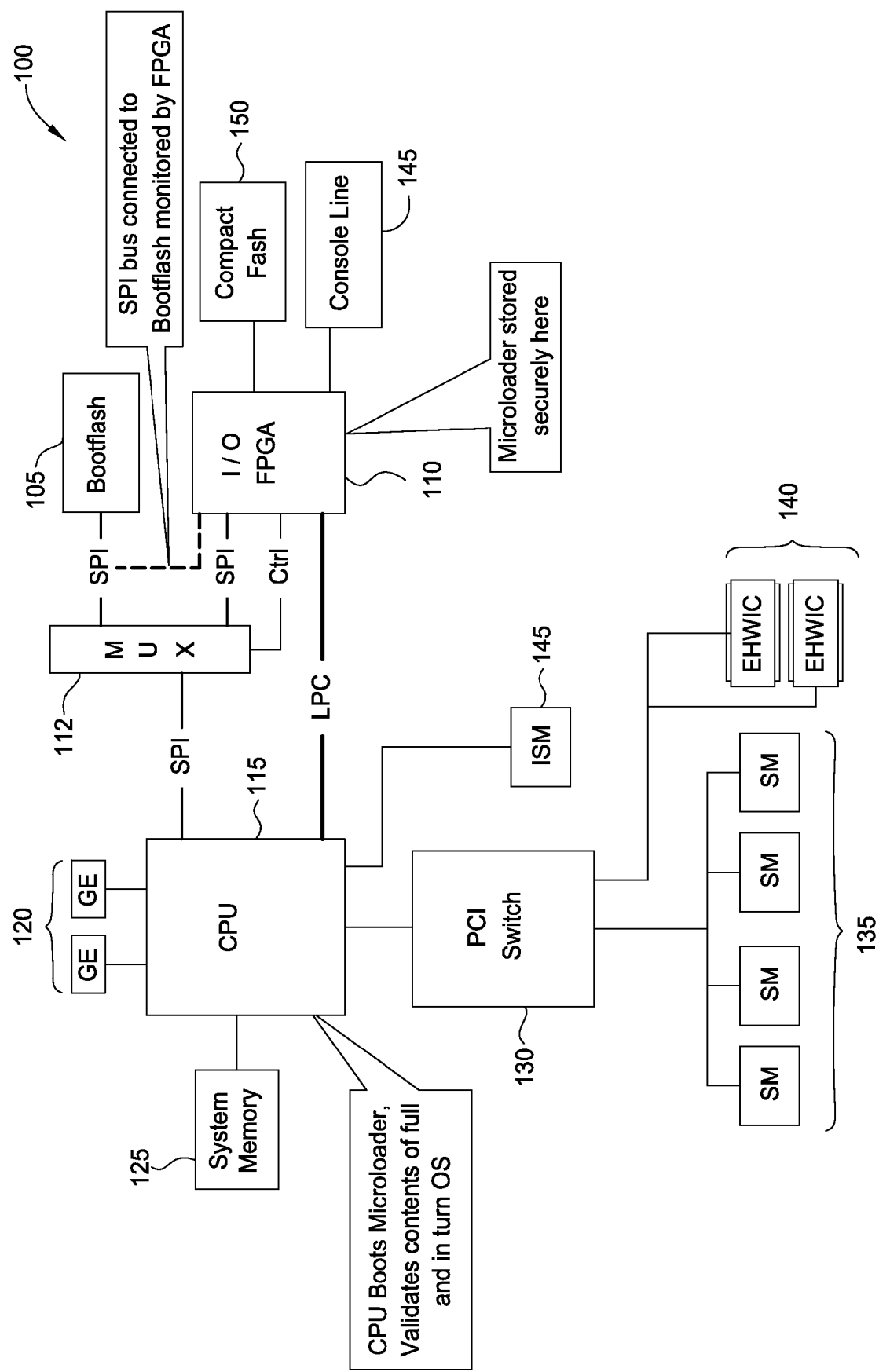
FIG. 1A illustrates an example of a computing architecture used to validate instructions used to boot a computing device, according to certain embodiments of the present disclosure.

One embodiment described herein includes a computing device having a processor, a first hardware component, a boot flash storage area storing a boot image, and a microloader executed to perform an operation. The operation itself may generally include retrieving the boot image from a boot flash storage area, validating the boot image, thereby producing one or more validation results and signaling the first hardware component of the computing device with at least one of the one or more validation results. The first hardware component may generally be configured to prevent the processor from executing the boot image until receiving the signal from the microloader with at least one validation result indicating the boot image is valid.

In a particular embodiment, the computing device includes a multiplexor disposed between the processor and the boot flash storage area, and wherein the multiplexor is controlled by the first hardware component. And the processor, FPGA, and boot flash storage area may be connected by a serial peripheral interface, mediated by the multiplexor.

Further, the first hardware component may a field programmable gate array (FPGA), but could also be an application specific integrated circuit (ASIC). The microloader may be executed by either the FPGA or the processor. Further still, in one embodiment the FPGA may validate the microloader prior to passing the microloader to the processor for execution.

Additional embodiments include a computer readable storage medium, storing a program configured to perform the aforementioned operation, and a method for verifying the authenticity of a boot image used to boot a computing device that includes performing the operation of the microloader discussed above.

Description of Example Embodiments

Many computing devices are configured to inject a boot image (e.g., a BIOS) directly to a CPU from a flash memory device connected via a serial peripheral interface (SPI). A parallel interface can be configured to provide a similar function. In some cases, it may be trivial to reprogram such an SPI flash with unauthorized code (e.g., a modified BIOS/ROM-MON/OS image etc.) and compromise the system. In addition to "flashing" the BIOS memory with an unauthorized boot image other "upgrade" attack vectors include wiring around or physically removing hardware that provides security checks. Many of these types of "upgrade" attacks occur because of an inability to prevent a modified or otherwise unauthorized BIOS and/or OS from being introduced into the boot flash memory.

Embodiments described herein provide techniques for validating a boot image used to boot a computing device and preventing (or at least making it substantially more difficult) for users to successfully perform these types of "upgrade" attacks. In particular, embodiments described herein prevent a computing device from booting a modified BIOS/ROM-MON, OS, etc. As described in more detail below, the actions performed to validate the boot image may be performed by a field programmable gate array (FPGA) connected to a main board of a computing device. In addition to validating a boot image, the I/O FPGA may be configured to control, among other things, console communication lines, system LEDs, Ethernet connections, interrupt aggregation, functions off-loaded from a CPU (e.g., crypto acceleration), watchdog timers, etc. Doing so makes it significantly more difficult for a computing device to be modified in a manner that allows an unauthorized boot image to be booted, as the FPGA cannot be removed without significantly disrupting other aspects of the device.

In one embodiment, a multiplexor (mux) is introduced between the CPU, an SPI Flash and an I/O FPGA. In such a case, the I/O FPGA may control a reset line for the CPU. On boot, the I/O FPGA holds the CPU in reset, checks itself, and controls the mux in order to send a microloader to the CPU. The microloader provides a set of instructions configured to validate the boot image stored in the flash storage. Once passed to the CPU, the I/O FPGA switches the mux to allow the microloader to fetch and validate the full boot image from the boot flash memory. Additionally, the I/O FPGA is placed on the SPI interface between the CPU and the SPI Flash (either via the mux or directly on the SPI interface) and monitors the validation transaction. If the I/O FPGA does not observe an expected validation of the boot image, the I/O FPGA can hold the CPU in reset, preventing the system from booting at all, or otherwise modify the behavior of the system. For example, the I/O FPGA could change the functioning of console, external flash interfaces, LEDs, network and interrupt signals, etc., to indicate the system has been the subject of unauthorized modifications.

Alternatively, the I/O FPGA itself may include enough intelligence to validate the contents of the boot flash memory prior to allowing the CPU to access the boot image in the boot flash memory. That is, the I/O FPGA could store and execute the microloader instructions directly. As another alternative, the microloader could be stored in the boot flash memory. In the latter case, the I/O FPGA may retrieve and validate the microloader and pass it to the CPU. Thereafter, the CPU executes the microloader to retrieve and validate the boot image in the boot flash memory. Provided both validations are successful, the FPGA releases the CPU from reset, allowing the full boot image to be retrieved and executed.

As yet another alternative, instead of introducing a mux, the boot flash memory could be moved behind the I/O FPGA. Doing also allows the I/O FPGA to implement the monitoring and muxing features directly, but without requiring extra interconnects to be added to the device.

FIGS. 1A-1B, 2A-2B, 3A-3B and 4A-4B further illustrate these example embodiments above. Of course, one ordinary skill in the art will recognize that these approaches may be adapted or modified in a variety of ways suit the needs of a particular case. For example, a similar approach could be used for a boot flash memory attached to a CPU using a parallel interface, instead of the serial peripheral interface (SPI) used to describe some embodiments herein. Further, the validation provided by the I/O FPGA could be performed by other components within a computing device. For example, embodiments may be implemented in an application specific integrated circuit (ASIC) or in a software solution in a co-processor.

At the same time, each of these example embodiments entangles the boot validation mechanism with other aspects of system operation, making it difficult to remove or subvert this boot validation mechanism. For example, interrupting the typical direct connection between a CPU and SPI flash via a mux and I/O FPGA allows the very first instructions that boot the machine (microloader or BIOS) to come from a validated source. That is, it ensures that the first instructions executed by a processor boot the device come from the I/O FPGA or from an already validated boot image. Further, these solutions provide the necessary surveillance function to ensure that an attacker has not bypassed the secondary boot function so as to boot their own code to subvert the device to their own ends.

Further, the following description is presented to enable one of ordinary skill in the art to make and use the proposed techniques. Descriptions of specific embodiments and applications are provided only as examples and various modifications will be readily apparent to those skilled in the art. The general principles described herein may be applied to other embodiments and applications without departing from the scope of the disclosure. Thus, the present disclosure is not to be limited to the embodiments shown, but is to be accorded the widest scope consistent with the principles and features described herein. For purpose of clarity, features relating to technical material that is known in the technical fields related to the proposed ideas have not been described in detail.

FIG. 1A illustrates an example of a computing architecture 100 used to validate instructions used to boot a computing device, according to certain embodiments of the present disclosure. Note, the computing architecture 100 illustrated in FIG. 1A (and FIGS. 2A, 3A and 4A) is intended to be representative of a variety of computing devices including well-known computing architectures for server or general-purpose computing systems, desktop, laptop or other portable or mobile devices (e.g., mobile telephones or tablet devices), as well as representative of other more specialized computing devices such as network switching and routing equipment, telephony or CMTS systems, turnkey systems or other computing appliances.

As shown, the computing architecture 100 includes a boot flash 105, an I/O FPGA 110, a mux 112 and a CPU 115, configured to validate a boot image stored in the boot flash 105. The computing architecture 100 also includes gigabit Ethernet connections 120, system memory 125, a PCI switch 130 and connected service modules 135. The service modules 135 generally provide higher level services such as firewall services or offload compression or encryption functions from the CPU 115. Ethernet switch high-speed WAN Interface cards 140, and integrated services module 145.

The boot flash 105 provides a flash memory device used to store a boot image. In turn, the I/O FPGA 110 provides a configurable logic device used to control a variety of computing activity performed by the computing architecture 100. For example, the I/O FPGA 110 may be configured to control, among other things, console communication lines, system LEDs, Ethernet connections, interrupt aggregation, functions offloaded from the CPU (e.g., crypto acceleration), watchdog timers, etc.

In the example embodiment of FIG. 1A, the I/O FPGA 110 also stores a microloader. The microloader provides a relatively small set of instructions executed by the CPU to validate the boot image stored in the boot flash 105 when the computing architecture 100 is powered on. To this end, when computing architecture 100 is powered on, the I/O FPGA configures the mux 112 to stream the microloader over the SPI interface to the CPU 115. Once delivered to the CPU, the I/O FPGA 110 uses a control line to connect the CPU 115 to the boot flash 105 via the mux 112. Thereafter, the microloader validates whether the boot image stored in the boot flash 105 is authentic. For example, in one embodiment, the microloader may generate an appropriate cryptographic hash HMAC or digital signature from the boot image to compare with an expected value supplied by the I/O FPGA 110. If the validation is successfully completed, then the microloader sends a signal to the I/O FPGA 110, using a low pin count (LPC) bus, for example. In response, the I/O FPGA configures the mux 112 to connect the CPU 115 to the boot flash 105 and releases the CPU 115 from reset. Thereafter, the CPU streams the boot image over the mux-mediated SPI interface and boots as normal.

Once booted, the computing architecture 100 may be used for its generally intended purpose. For example, applications stored in system memory 125 may be executed by the CPU to route network traffic between gigabit Ethernet connections 120 and EHWIC cards 140. Further, service modules 135 may be used to provide network routing, firewall, quality of service, or other services for network traffic provided by computing architecture 100. Similarly, the Integrated Services Module (ISM) 145 provides high-performance, hardware-assisted tunneling and encryption services suitable for virtual private network (VPN) remote access and site-to-site intranet and extranet applications. Additionally, the I/O FPGA 110 may continue to provide services to the computing architecture 100 once booted. For example, I/O FPGA may be accessed via console line 145 and store data in compact flash 150.

Figure 1B:
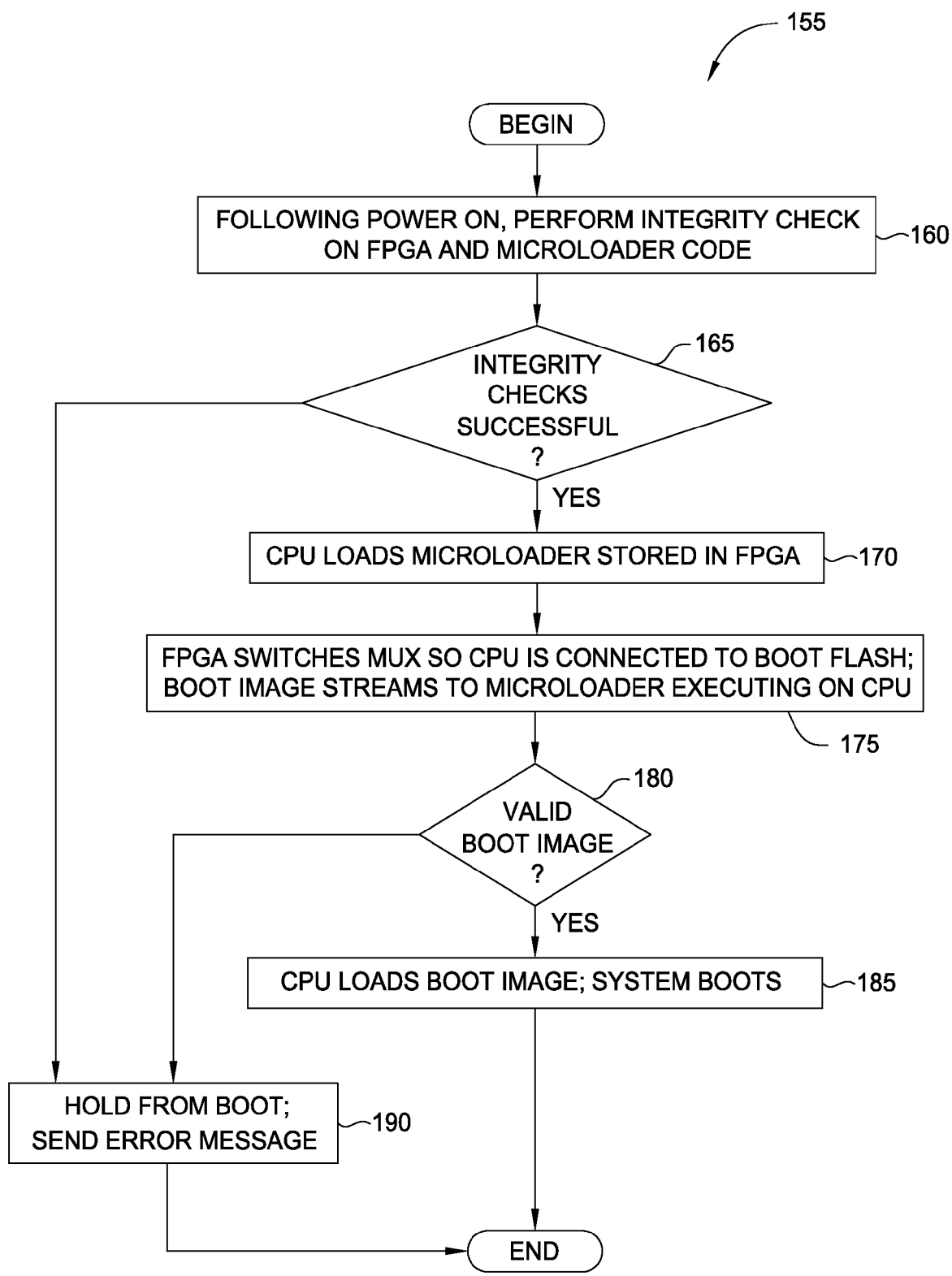
FIG. 1B illustrates a method for validating a boot image using the computing architecture of FIG. 1A, according to certain embodiments of the present disclosure.

The operations for validating a boot image using computing architecture 100 are further shown in FIG. 1B, which itself illustrates a method 155 for validating a boot image using the computing architecture of FIG. 1A, according to certain embodiments of the present disclosure. As shown, the method 155 begins at step 160, where following system power on, the I/O FPGA performs an integrity check on the FPGA and microloader code. That is, the I/O FPGA verifies that it is functioning properly. Provided the integrity check is successful (step 165), then the CPU loads the microloader stored by the I/O FPGA (step 170). As noted above, the FPGA may mediate this by controlling a mux connected to the CPU and an SPI boot flash. Once the CPU loads the microloader, the FPGA switches the mux to connect the CPU to the boot flash (i.e., to the flash storage storing the boot image), and the CPU retrieves the boot image stored therein. At step 180, the microloader determines whether the boot image stored in the boot flash is valid. For example, the microloader may use a variety of cryptographic techniques, checksums, HMACs etc., to validate the boot image.

If valid, at step 185, the FPGA releases the CPU from reset, which, in response, streams the boot image into the CPU and the system boots as normal. Otherwise, should the integrity check performed at step 165 fail (indicating the FPGA has failed or was tampered with) or the microloader fails to validate the boot image (indicating the boot image has been modified), then at step 190 the FPGA holds the system from booting. Additionally, the FPGA may be configured to send an error message. For example, the FPGA could cause LED lights to signal in a particular manner, present a message on a display screen, cause a speaker to sound a predefined tone, send a message over a network connection, etc.

Figure 2A:
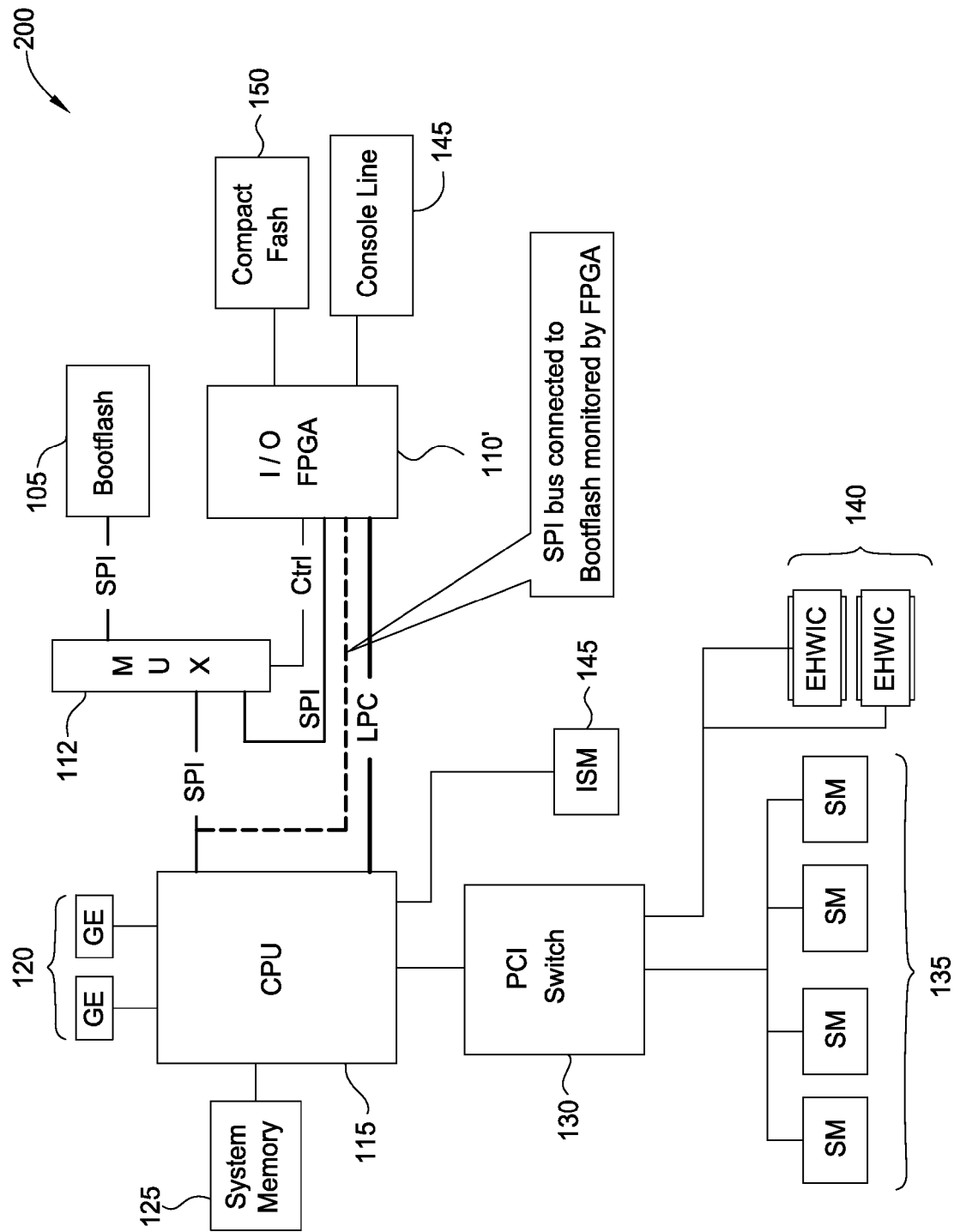
FIG. 2A illustrates another example of a computing architecture used to validate instructions used to boot a computing device, according to certain embodiments of the present disclosure.

FIG. 2A illustrates another example of a computing architecture 200 used to validate instructions used to boot a computing device, according to certain embodiments of the present disclosure. The elements of computing architecture 200 generally correspond to the computing architecture 100 of FIG. 1A. However, rather than streaming the microloader to the CPU 115, the I/O FPGA 210 is configured to execute the microloader. To that end, the I/O FPGA 210 includes enough intelligence to validate the contents of the boot flash memory prior to allowing the CPU to access the boot image in the boot flash memory.

Figure 2B:
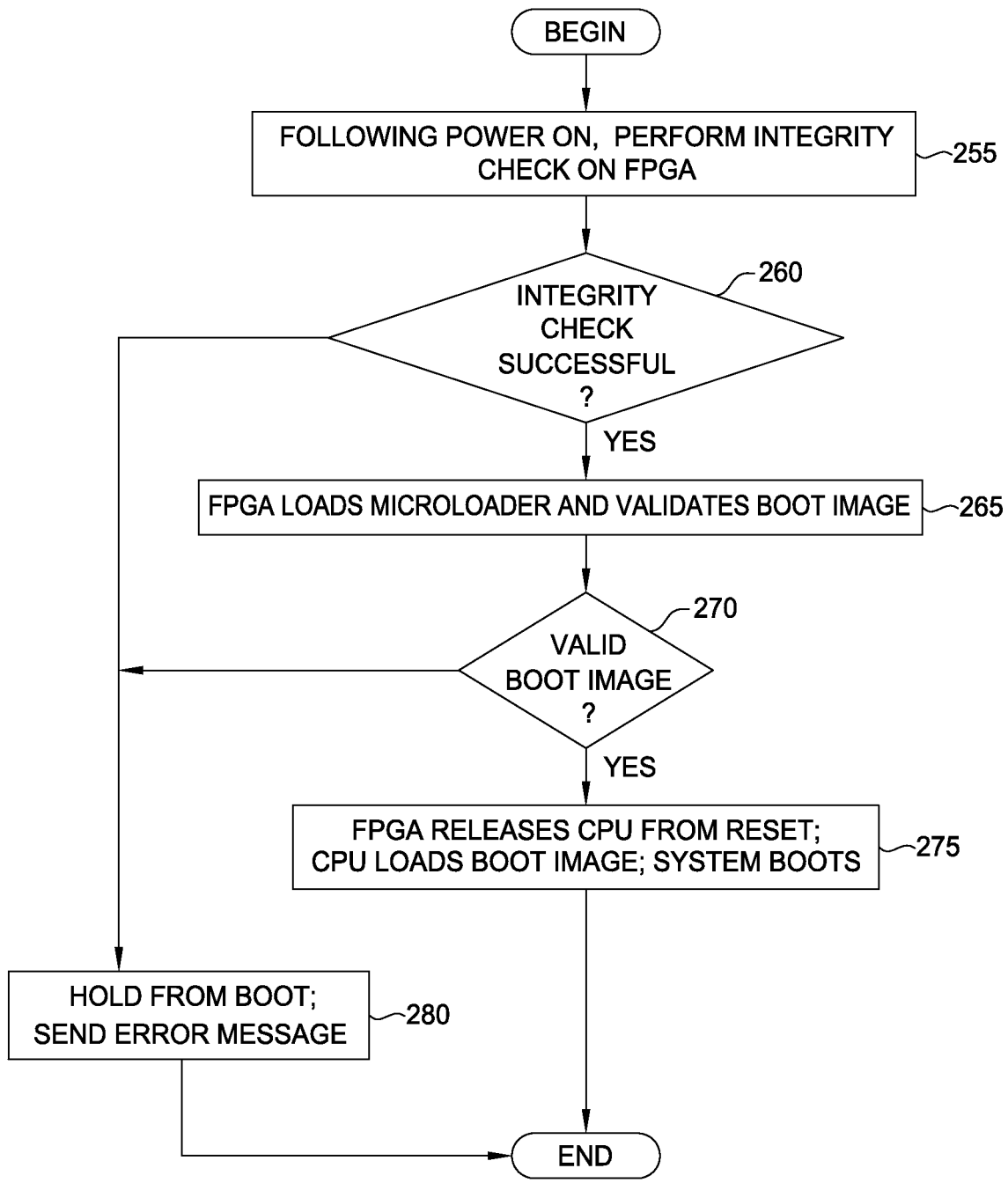
FIG. 2B illustrates a method for validating a boot image using the computing architecture of FIG. 2A, according to certain embodiments of the present disclosure.

FIG. 2B illustrates the operations for validating a boot image using computing architecture 200. More specifically, FIG. 2B illustrates a method 250 for validating a boot image using the computing architecture of FIG. 2A, according to certain embodiments of the present disclosure. As shown, the method 250 begins at step 255, where following system power on, the I/O FPGA performs an integrity check on the FPGA, i.e., the I/O FPGA verifies that it is functioning properly. Provided the integrity check is successful (step 260), the I/O FPGA loads the microloader stored by the I/O FPGA (step 265). In one embodiment, the I/O FPGA loads the microloader from the boot flash. Alternatively, however the microloader may be stored as part of the I/O FPGA or in another flash memory local to the FPGA. Once loaded, the I/O FPGA configures the mux to connect to the FPGA and stream the boot image stored in the boot flash.

At step 270, if the boot image validates successfully, then the I/O FPGA releases the CPU from reset, which, in response, streams the boot image into the CPU and the system boots as normal. Otherwise, should the integrity check performed at step 260 fail (indicating the FPGA has failed or has been tampered with) or the I/O FPGA fails to validate the boot image (indicating the boot image has been modified), then at step 280 the FPGA holds the system from booting. As noted above, the I/O FPGA could cause LED lights to signal in a particular manner or cause a speaker to sound a predefined tone to signal this result.

Figure 3A:
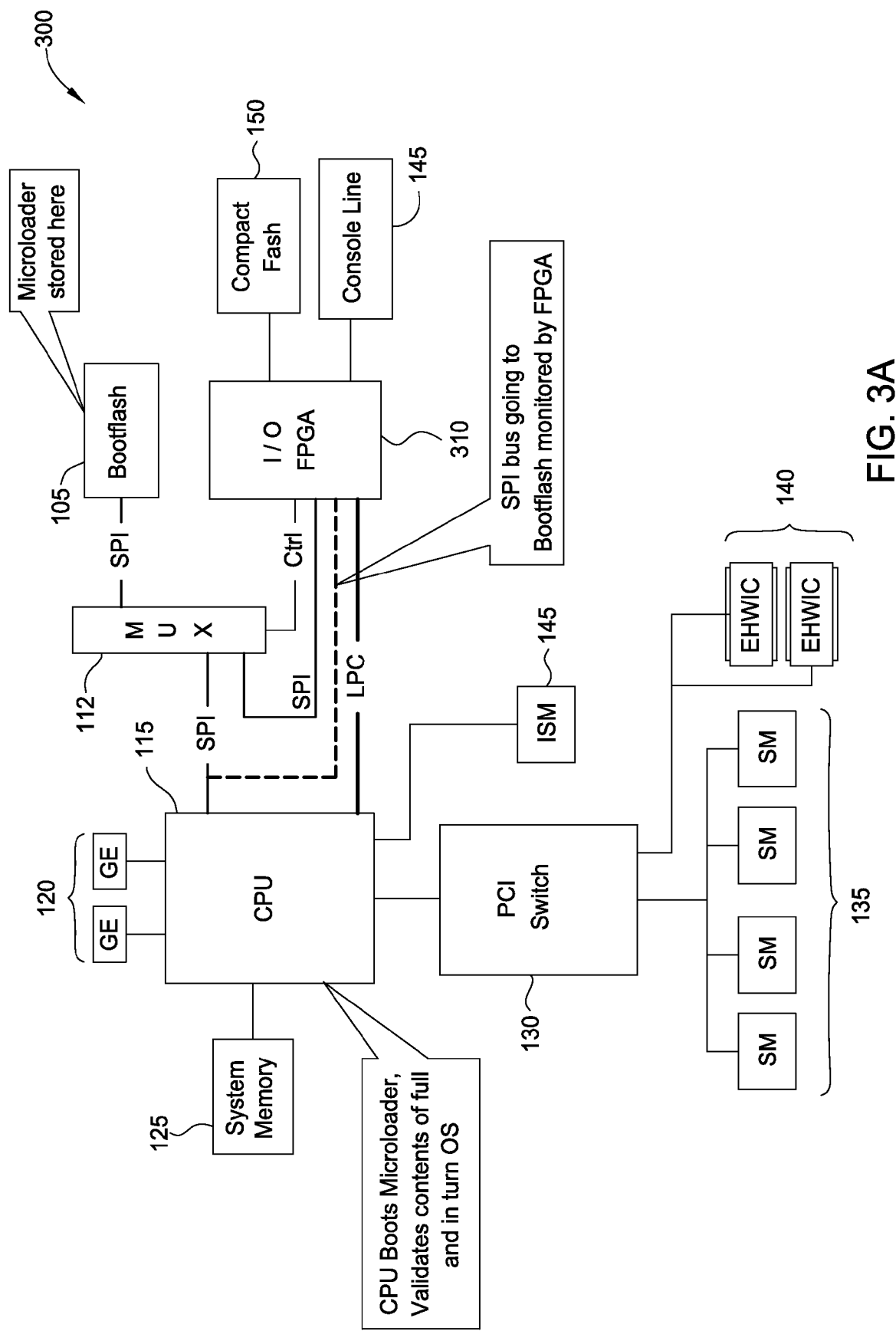
FIG. 3A illustrates another example of a computing architecture used to validate instructions used to boot a computing device, according to certain embodiments of the present disclosure.

FIG. 3A illustrates another example of a computing architecture 300 used to validate a boot image used to boot a computing device, according to certain embodiments of the present disclosure. In the Example of FIG. 3A, the microloader is stored in boot flash 105 along with the boot image. Further, the I/O FPGA 310 may be configured to configure the mux 112 to retrieve the microloader from the boot flash 105 and validate that it has not been modified. Once validated the I/O FPGA controls the mux so that the microloader is streamed to the CPU, which in turn retrieves and validates the boot image stored in the bootflash 105. If successful the I/O FPGA 310 releases the CPU from reset, allowing the CPU to retrieve and boot the boot image from the bootflash 105. As noted above, the boot image (e.g., a ROMMON, bootstrap code or BIOS) may include a cryptographic signature, as doing so allows field upgradability. However configuring an FPGA to authenticate a PKI signature may be very costly. Validating only the microloader using this option and then having the microloader perform the cryptographic operations on the CPU results in a less costly FPGA.

Figure 3B:
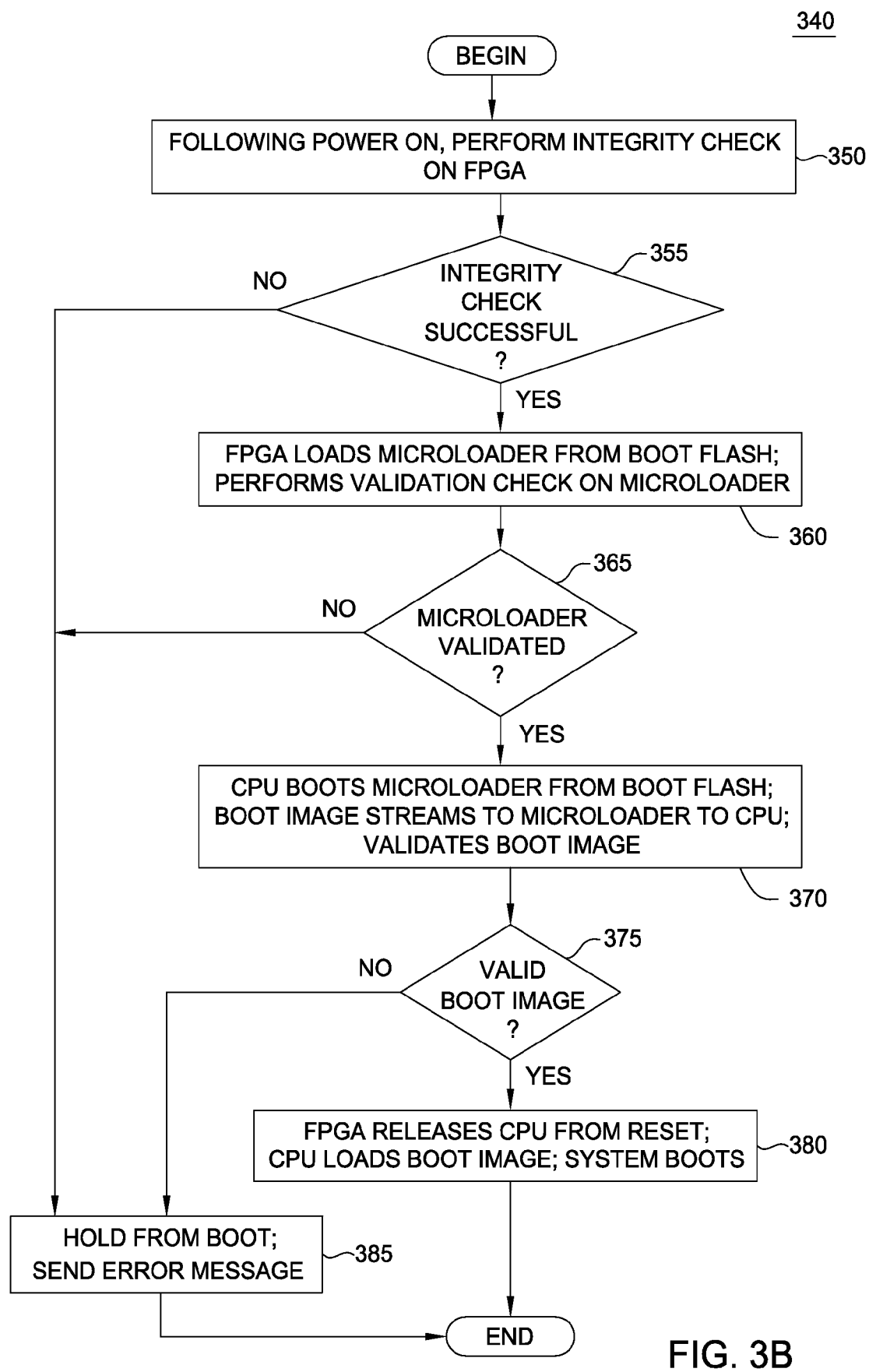
FIG. 3B illustrates a method for validating a boot image using the computing architecture of FIG. 3A, according to certain embodiments of the present disclosure.

FIG. 3B illustrates the operations for validating a boot image using computing architecture 200. More specifically, FIG. 3B illustrates a method 340 for validating a boot image using the computing architecture of FIG. 3A, according to certain embodiments of the present disclosure. The method 340 begins at step 350, where following system power on, the I/O FPGA performs an integrity check on the FPGA, as done for the embodiments shown in FIGS. 1B and 2B. Provided the power-on integrity check is successful (step 355), then at step 360, the I/O FPGA loads a microloader from the boot flash and performs a validation check to verify the authenticity of the microloader. If the microloader is validated (step 365), then the I/O FPGA connects the CPU to the boot flash via the mux and allows the CPU retrieve the microloader (step 370).

Once loaded, the CPU executes the microloader to load and validate the boot image (step 375). For example, the CPU microloader may be configured to perform the appropriate cryptographic operations to generate a HMAC or other cryptographic token from the boot image and compare to an expected value for the token. If valid, the FPGA releases the CPU from reset, which, in response, streams the boot image allowing the system to boot as normal (step 380). Otherwise, should any of the validations performed at steps 355, 365, or 375, fail, then the FPGA holds the system from booting (step 385). Additionally, the FPGA may be configured to send an error message. As noted above, e.g., the FPGA could cause LED lights to signal in a particular manner, present a message on a display screen, cause a speaker to sound a predefined tone, send a message over a network connection, etc.

Figure 4A:
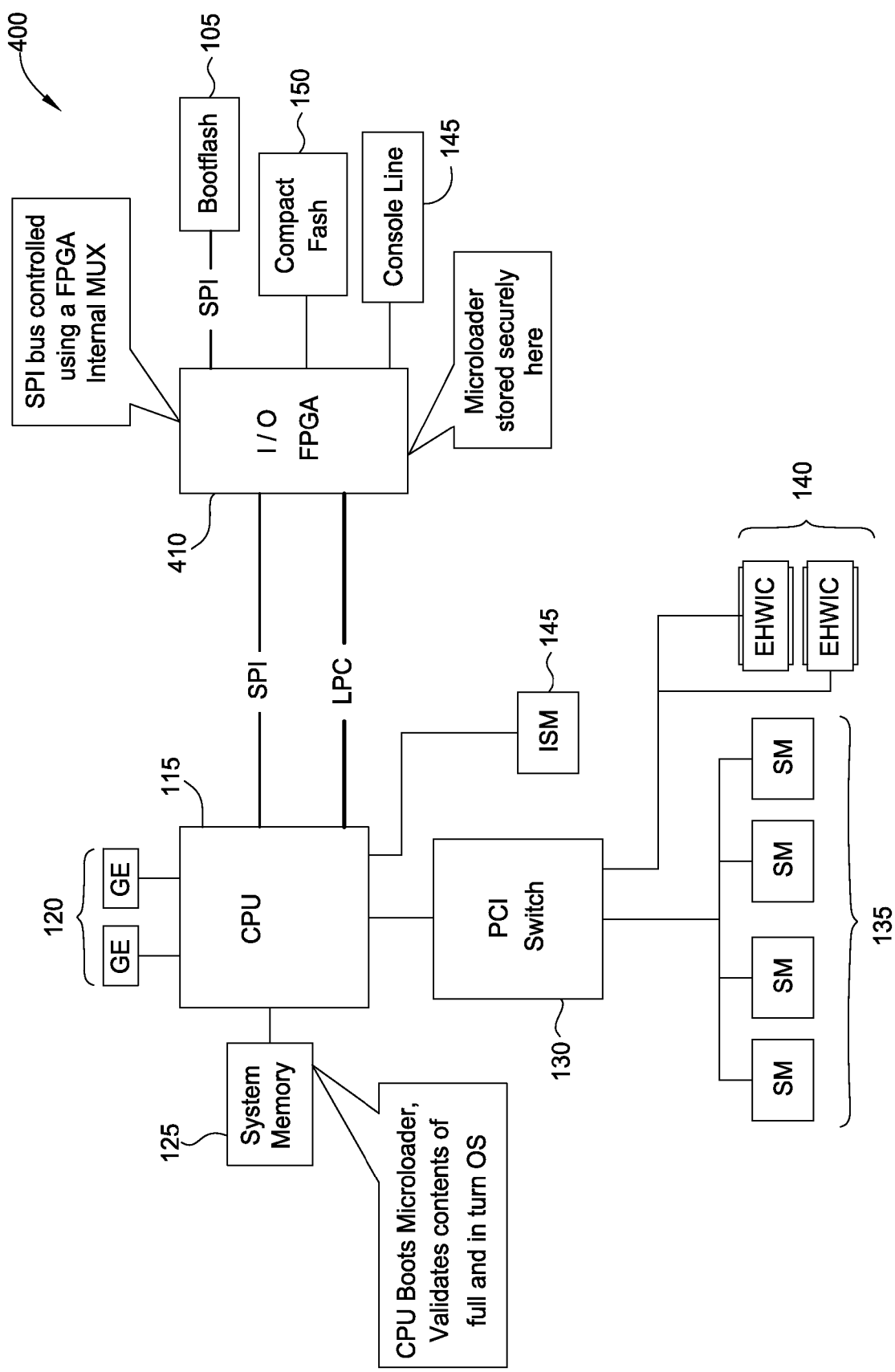
FIG. 4A illustrates another example of a computing architecture used to validate instructions used to boot a computing device, according to certain embodiments of the present disclosure.

Unlike the embodiments, shown in FIGS. 1A, 2B and 3A which includes mux-mediated connection between the I/O FPGA, CPU and boot flash, FIG. 4A illustrates an example of a computing architecture 400 used to validate instructions used to boot a computing device that does not include a mux. Instead, the mux may be integrated with the I/O FPGA. As shown, an I/O FPGA 410 is disposed between the boot flash 105 and the CPU 115. To validate the boot image, the I/O FPGA 410 streams the microloader to CPU 115, and then streams the boot image to the microloader executing on the CPU 115. In turn, the CPU 115 validates the boot image at which point the CPU jumps to the boot image and begins the normal boot up process.

Figure 4B:
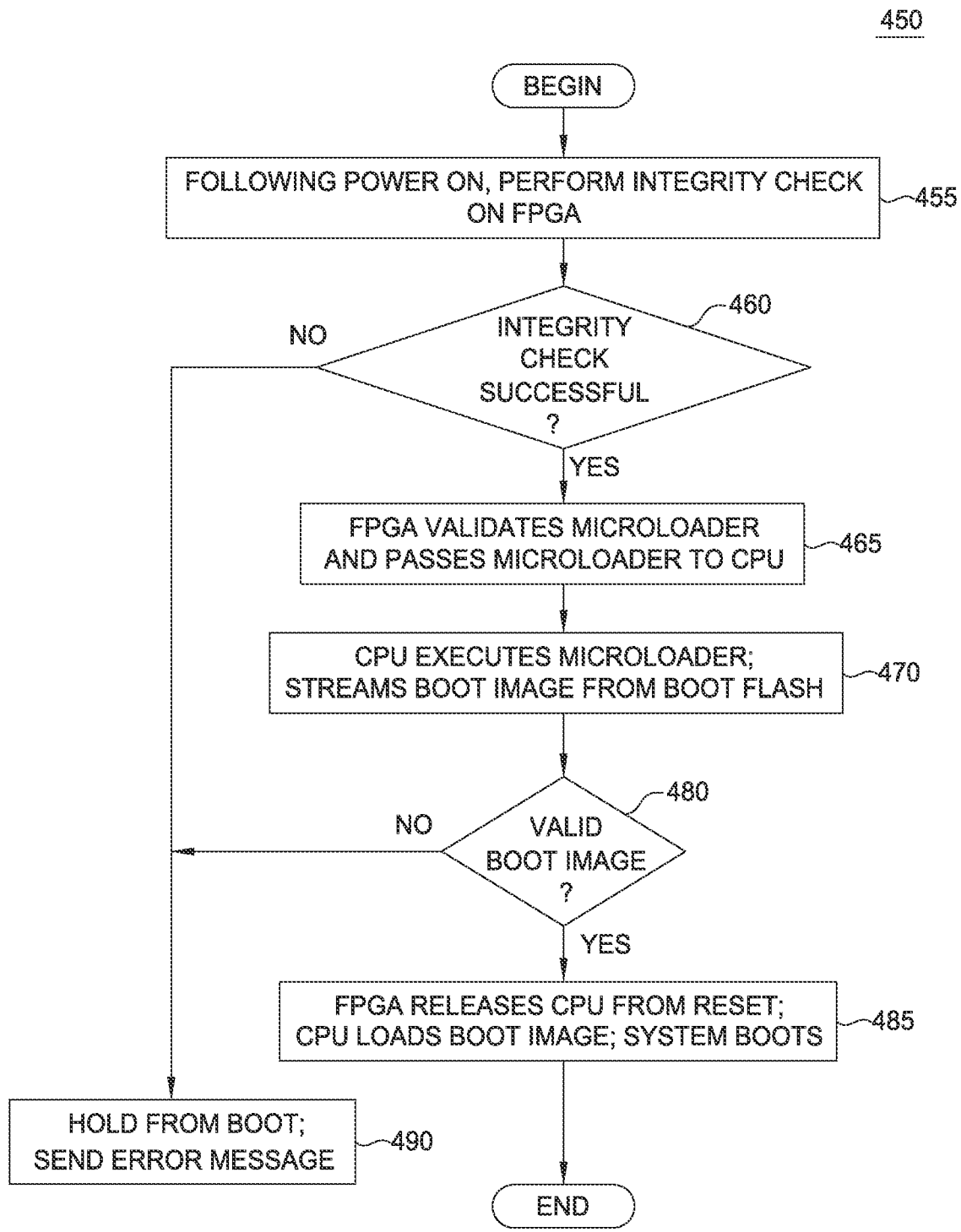
FIG. 4B illustrates a method for validating a boot image using the computing architecture of FIG. 4A, according to certain embodiments of the present disclosure.

FIG. 4B illustrates a method 450 for validating a boot image using the computing architecture 400 of FIG. 4A, according to certain embodiments of the present disclosure. As shown, the method 450 begins at step 455, where following system power on, the I/O FPGA performs an integrity check on the FPGA. Again, the integrity check of step 455 is performed to ensure the I/O FPGA is functioning properly. Provided the integrity check is successful (step 460), then at step 465 the FPGA validates the microloader and passed it to the CPU. Of course, if the microloader fails the integrity check, the I/O FPGA can prevent the system from booting. Assuming the microloader successfully validates, the I/O FPGA passes it to the CPU. At step 470, the CPU executes the microloader and streams the boot image from the boot flash, as mediated by the I/O FPGA. Once retrieved, the microloader validates the boot image, as described above. At step 480, the microloader determines whether the boot image is valid. If the validation results indicate the boot image is valid, the method proceeds to step 485. If the validation results indicate the boot image is not valid, the method proceeds to step 490.

At step 485, if the boot image validates successfully, then the I/O FPGA releases the CPU from reset, which, in response, streams the boot image, allowing the system to boot normally. Otherwise, should the validations performed at step 480 fail, the FPGA holds the system from booting (step 490). Additionally, the FPGA may be configured to send an error message. As noted above, e.g., the FPGA could cause LED lights to signal in a particular manner, present a message on a display screen, cause a speaker to sound a predefined tone, send a message over a network connection, etc.

In sum, embodiments presented in this disclosure provide techniques for validating a boot image used to boot a computing device which prevent (or at least make it substantially more difficult) for users to successfully perform an upgrade attack. In particular, embodiments described herein prevent a computing device from booting a modified BIOS/ROMMON, OS, etc. For example, an FPGA and a mux may be connected to boot flash storing a boot image. A microloader may be passed to the CPU and executed to retrieve and validate the boot image stored in the boot flash. If valid, the FPGA releases the CPU from reset, allowing the system to boot normally. As described above, the FPGA may mediate this process by controlling a mux connected to the CPU and an SPI boot flash using a variety of different approaches. Interrupting the typical direct connection between a CPU and SPI flash via a mux and I/O FPGA ensures that the first instructions executed are provided by an already validated boot image.

While the forgoing is directed to embodiments of the present disclosure, other and further embodiments of the disclosure may be devised without departing from the basic scope thereof. For example, aspects of the present disclosure may be implemented in hardware or software or in a combination of hardware and software. One embodiment of the disclosure may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present disclosure, are embodiments of the present disclosure.

In view of the foregoing, the scope of the present disclosure is determined by the claims that follow.

We claim:

1. A system, comprising:
   a processor;
   a boot flash storage area storing a boot image; and
   a field programmable gate array (FPGA) configured to:
      validate an integrity of the FPGA and a microloader; and
      cause the validated microloader to be passed to the processor; and
   wherein the microloader, when executed by the processor, performs an operation comprising:

retrieving the boot image from the boot flash storage area;

validating the boot image; and sending, to the FPGA, at least one validation result indicating the boot image is authorized to be loaded by the system, wherein the FPGA is configured to prevent the processor from executing the boot image until the FPGA: (i) validates the integrity of the FPGA and the microloader, and (ii) receives the at least one validation result from the microloader.

2. The system of claim 1, wherein the system includes a multiplexor disposed between the processor and the boot flash storage area, wherein the multiplexor is controlled by the FPGA, wherein the FPGA holds the processor in reset until receiving, from the microloader, the at least one validation result indicating the boot image is authorized to be loaded by the system, wherein the FPGA is implemented as an application-specific integrated circuit (ASIC).

3. The system of claim 2, wherein the processor, FPGA, and boot flash storage area are connected by a serial peripheral interface that is mediated by the multiplexor.

4. The system of claim 2, wherein the processor, FPGA, and boot flash storage area are connected by a parallel interface.

5. The system of claim 1, wherein the microloader is configured to validate the boot image by generating a cryptographic value from the boot image and comparing the generated cryptographic value with an expected cryptographic value.

6. The system of claim 1, wherein validating the boot image produces the at least one validation result, wherein validating the boot image comprises determining whether the boot image is authorized to be loaded by the system.

7. The system of claim 6, wherein the microloader is stored in at least one of: (i) the FPGA, and (ii) the boot flash storage area.

8. The system of claim 7, wherein the processor, FPGA, and boot flash storage area are connected by a serial peripheral interface that is mediated by the multiplexor.

9. The system of claim 8, wherein the microloader is configured to validate the boot image by generating a cryptographic value from the boot image and comparing the generated cryptographic value with an expected cryptographic value.

10. The system of claim 9, wherein validating the integrity of the microloader comprises:

generating a microloader cryptographic value from a code of the microloader; and comparing the microloader cryptographic value with an expected microloader cryptographic value.

11. A non-transitory computer-readable storage medium storing code, which when executed by a processor performs an operation, comprising:

validating, by a field programmable gate array (FPGA), an integrity of the FPGA and a microloader; and passing, by the FPGA, the microloader to the processor;

wherein the microloader, when executed by the processor, performs an operation comprising:

retrieving the boot image from the boot flash storage area; and validating the boot image; and sending, to the FPGA, at least one validation result indicating the boot image is authorized to be loaded, wherein the FPGA is configured to prevent the processor from executing the boot image until the FPGA: (i) validates the integrity of the FPGA and the microloader, and (ii) receives the at least one validation result from the microloader.

12. The computer-readable storage medium of claim 11, wherein a multiplexor is disposed between the processor and the boot flash storage area, and wherein the multiplexor is controlled by the FPGA, wherein the FPGA holds the processor in reset until receiving, from the microloader, the at least one validation result indicating the boot image is authorized to be loaded, wherein the FPGA is implemented as an application-specific integrated circuit (ASIC).

13. The computer-readable storage medium of claim 12, wherein the processor, FPGA, and boot flash storage area are connected by a serial peripheral interface that is mediated by the multiplexor.

14. The computer-readable storage medium of claim 12, wherein the processor, FPGA, and boot flash storage area are connected by a parallel interface.

15. The computer-readable storage medium of claim 11, wherein the microloader is configured to validate the boot image by generating a cryptographic value from the boot image and comparing the generated cryptographic value with an expected cryptographic value.

16. A computer-implemented method, comprising:

validating, by a field programmable gate array (FPGA), an integrity of the FPGA and a microloader; and passing, by the FPGA, the microloader to a processor;

wherein the microloader, when executed by the processor, performs an operation comprising:

retrieving the boot image from the boot flash storage area;

validating the boot image; and sending, to the FPGA, at least one validation result indicating the boot image is authorized to be loaded, wherein the FPGA is configured to prevent the processor from executing the boot image until the FPGA: (i) validates the integrity of the FPGA and the microloader, and (ii) receives the at least one validation result from the microloader.

17. The computer-implemented method of claim 16, wherein a multiplexor is disposed between the processor and the boot flash storage area, and wherein the multiplexor is controlled by the FPGA, wherein the FPGA holds the processor in reset until receiving, from the microloader, the at least one validation result indicating the boot image is authorized to be loaded, wherein the FPGA is implemented as an application-specific integrated circuit (ASIC).

18. The computer-implemented method of claim 4, wherein the processor, FPGA, and boot flash storage area are connected by a serial peripheral interface that is mediated by the multiplexor.

19. The computer-implemented method of claim 4, wherein the microloader is configured to validate the boot image by generating a cryptographic value from the boot image and comparing the generated cryptographic value with an expected cryptographic value.

* * * * *